United States Patent

[11] 3,626,114

[72] Inventors George W. Lewicki
Studio City;
John E. Guisinger, Altadena, both of Calif.
[21] Appl. No. 805,549
[22] Filed Mar. 10, 1969
[45] Patented Dec. 7, 1971
[73] Assignee California Institute of Technology
Pasadena, Calif.

[54] THERMOMAGNETIC RECORDING AND MAGNETO-OPTIC PLAYBACK SYSTEM
9 Claims, 3 Drawing Figs.

[52] U.S. Cl. .......... 179/100.2CH, 340/174.1 M, 346/74 MT
[51] Int. Cl. .......... G11b 11/10, G11b 5/32
[50] Field of Search .......... 179/100.2 CH, 100.2 CR; 346/74 MT; 340/174.1 MO

[56] References Cited

UNITED STATES PATENTS

| | | | |
|---|---|---|---|
| 2,915,594 | 12/1959 | Burns | 346/74 |
| 3,164,816 | 1/1965 | Chang | 346/74 |
| 3,364,496 | 1/1968 | Greiner | 179/100.2 |
| 3,465,311 | 9/1969 | Bertelsen | 346/74 |
| 3,512,168 | 5/1970 | Bate | 346/74 |

OTHER REFERENCES

Treves, D. " Magneto-Optic Detection of High-Density Recordings," Journal of Applied Physics, Vol. 38, No. 3, Mar., 1967, p. 1192

*Primary Examiner*—Bernard Konick
*Assistant Examiner*—Jay P. Lucas
*Attorneys*—Samuel Lindenberg and Arthur Freilich

ABSTRACT: A magnetic recording and magneto-optic playback system is disclosed wherein thermomagnetic recording is employed. A transparent isotropic film is heated along a continuous path by a focused laser beam. As each successive area of the path is heated locally to the vicinity of its Curie point in the presence of an applied magnetic field, a magneto-optic density is established proportional to the magnetic field and fixed in place as the area cools once the laser beam moves on to an adjacent area. The magnetic field is varied by an input signal so that the magneto-optic density established in a given area of the film is proportional to the amplitude of the input signal being applied. To play back the recorded data, the intensity of the laser beam is reduced to avoid reaching the vicinity of the Curie point of the film as it is scanned by the laser beam in the same manner as for recording. A Faraday effect analyzer and photo detector are employed as a transducer for producing an output signal.

GEORGE W. LEWICKI
JOHN E. GUISINGER
INVENTORS

BY Lindenberg & Freilich
ATTORNEYS

THERMOMAGNETIC RECORDING AND MAGNETO-OPTIC PLAYBACK SYSTEM

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to a method and apparatus for thermomagnetic recording and optical playback of data. In this method, a focused beam of radiant energy is used to heat a continuous trace of small areas of a thin film of suitable magnetic material to the vicinity of the Curie point of each successive area to so reduce its coersive force that a magnetic field may change the direction and/or amplitude of magnetism of the material within the heated area in proportion to an applied signal, and allowing each of the succession of small areas to cool while in the presence of the magnetic field.

In the past, only binary data has been thermomagnetically recorded because of the common belief that upon cooling, a selected area of premagnetized film would acquire only the opposite magnetization upon being heated above the Curie point, thus allowing for only discrete binary magneto-optic states. See for example Ludwig Mayer, J. Appl. Phys., Vol 29, page 1,003 (1958). In IEEE trans. on Magnetics, Vol. 1, No. 1, pages 72 to 75 (1967), C. D. Mee et al. consider thermomagnetic writing by locally heating a film in the presence of a magnetic field using a laser beam. While beam scanning is considered, the authors apparently believe that recording can proceed only by setting the applied magnetic field opposite the polarity to which the film has been uniformly preset. Digital information is then recorded by modulating the laser beam to switch the magnetization of the film in discrete areas to saturation.

It has been discovered that allowing successively heated areas to cool in the presence of an applied magnetic field which varies as a function of an analog signal will result in a magneto-optic density variation in those areas proportional to the variations in the applied magnetic field. Thus, by allowing each area to cool while in the presence of a controlled magnetic field, the magneto-optic density produced is effectively controlled to all degrees between two extreme values.

For purposes of this invention, magneto-optic density is defined as the degree and direction of magnetization of the film which will produce a magneto-optic (Faraday or Kerr) effect of a corresponding degree and direction. Polarized light transmitted through or reflected by the recorded path is rotated up to about ±40° in proportion to the signal applied. Thus, a Faraday or Kerr effect analyzer produces a light beam the amplitude of which varies as a function of the signal recorded. A conventional photo-sensitive device may be employed to produce an output signal. The term analog signal used herein is defined as an electrical signal which represents information or data by the amplitude of the signal, and if desired by both the amplitude and polarity of signal. Such a signal is generally a continuous waveform, but may from time to time be discontinuous at discrete points, such as when the signal is a television video signal of a scene having discrete boundaries between a white area and a black area, or when the signal represents digital information in binary code, or some other code. This definition of an analog signal is contrasted to a digital signal in which information is represented in discrete areas of magnetization, where the magnetization is at magneto-optic saturation of opposite polarities to represent ones and zeros. In other words, in the present invention the digital information may be present as an analog signal in the form of modulation on a carrier which may be some frequency such as 2 kHz., or a DC signal, including zero volts with respect to circuit ground, so long as the modulation is not sufficient to switch the magneto-optic density from saturation at one polarity to saturation at the opposite polarity in the process of recording ones and zeros.

SUMMARY OF THE INVENTION

According to a preferred embodiment of the invention, successive areas of a record path in a suitable magnetic film are heated to the vicinity of their Curie point, one area at a time in a continuous manner, and immediately allowed to cool in the presence of an applied magnetic field which varies in direction and magnitude in response to an input signal. As a heated area of the film cools, the magneto-optic density established by the magnetic field present is fixed. Since the magneto-optic density of a given segment of the film is proportionate to the direction and magnitude of the field present while it cooled, the input signal thus recorded is readily detectable by analysis of the magneto-optic effect produced on polarized light. For playback, the polarized light is directed toward the record path on the film in the same direction as the recording magnetic field.

In this preferred embodiment, a laser beam is employed to heat the film to the vicinity of its Curie point for recording. For maximum utilization of the film, a beam deflecting means is employed to deflect the beam back and forth as the film is moved synchronously along its length. A coil having a C-core with its opposing pole-face axes perpendicular to the film is employed to vary an applied magnetic field in response to an input signal as the film is scanned by the laser beam.

To play back recorded data, a monochromatic source of light is polarized (in order that the beam directed toward the film be subjected to the magneto-optic effect, i.e., rotation of the plane of vibration, in such a manner that it may be detected). The rotation of the plane of vibration of the polarized light beam is proportional to the magneto-optic density of the film which in turn is proportional to the magnetic field applied for recording. The magneto-optic effect on the beam of light passing through or reflected from the film is then detected by a suitable analyzer.

As a further feature of the present invention, the magneto-optic effect produced on the polarized beam during playback is analyzed by resolving the beam into orthogonal components and detecting the amplitude of each component separately. The desired output signal is then the difference between the two components which is independent of variations in the source of the polarized beam.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figures 1, 2, 3:
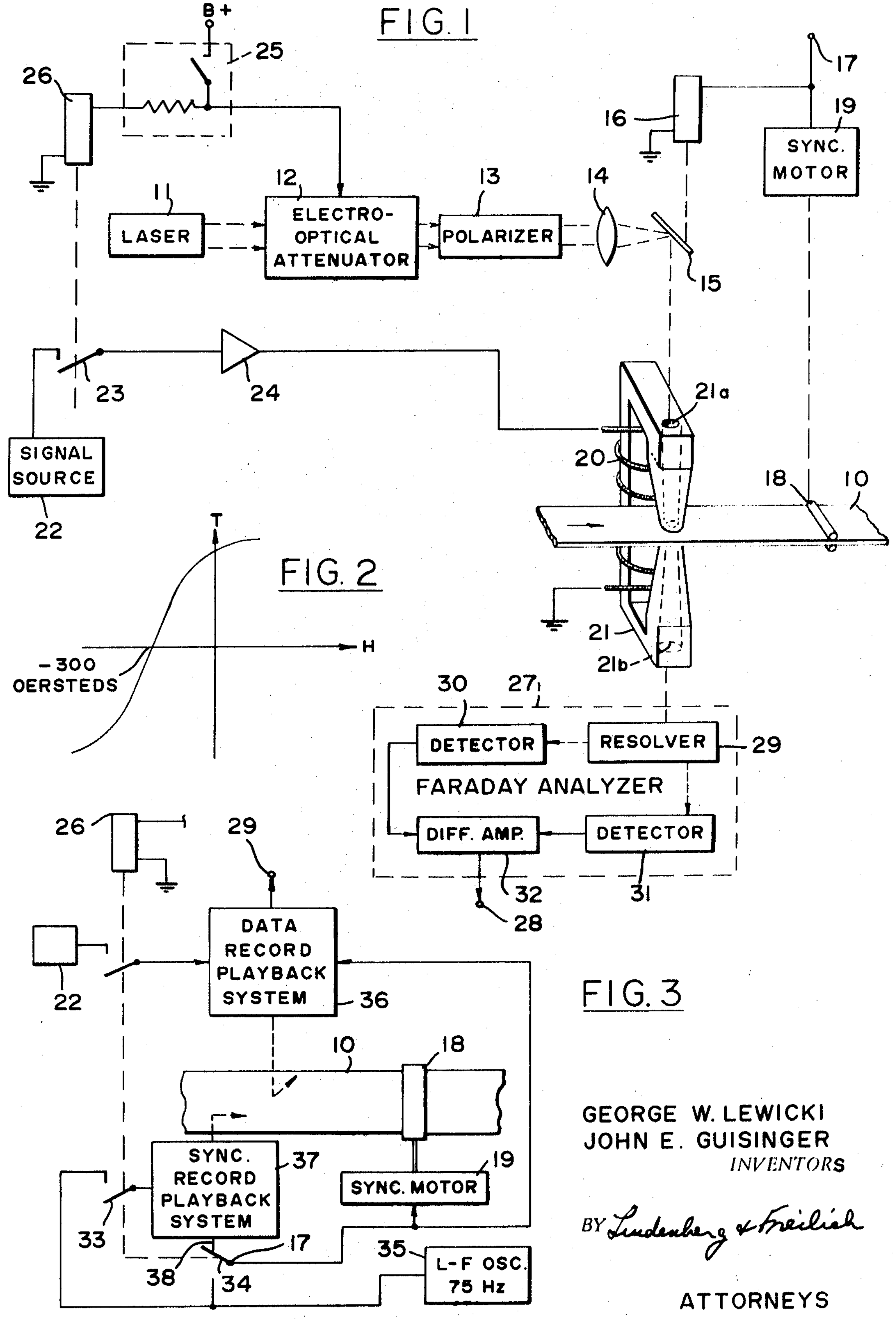
FIG. 1 shows a schematic block diagram for a thermal-magnetic recording and optical playback system according to the present invention.
FIG. 2 shows a typical plot of the relative transmission of illumination by an area of film as a function of an applied magnetic field H present during recording.
FIG. 3 shows a schematic block diagram for employing a second thermal-magnetic recording and optical playback system to record a synchronizing signal utilized in the recording of data in order that during playback the scanning of the record path may be synchronized.

In a preferred embodiment of the invention as shown in FIG. 1, a thin film 10 of suitable magnetic material is heated to the vicinity of its Curie point by a beam of light from a laser 11 transmitted through an energized electro-optical attenuator, such as a Pockels Cell 12. Suitable magnetic materials, such as manganese bismuthide (MnBi), are reported by C. D. Mee et al. in IEEE Transactions on Magnetics, supra. Chromium telluride (CrTe) and manganese germanium ($Mn_4Ge_3$) are also known to exhibit the magneto-optic effect. In the case of the manganese germanium material it has been found that the magneto-optic effect exists in molecules of manganese germanium with atomic configurations other than $Mn_4Ge_3$. In any case, as with other materials, the film is preferably thin (about 700 to 2,000 A.).

A polarizer 13 is provided to polarize the monochromatic light transmitted by the laser 11 through the attenuator 12, but it should be understood the polarizer 13 is required only for optical playback as will be described hereinafter. The polarized monochromatic light beam is focused by a lens 14 to a beam deflecting means, such as a mirror 15, to direct a very narrow beam of light onto the film 10 for the purpose of heating it to the vicinity of its Curie point.

As used herein, "heating to the vicinity of the Curie point" means above the Curie point or any suitable transition temperature at which the material may be magnetized in accordance with a magnetic field applied as described hereinafter. All materials which have thus far been found suitable require heating to above the Curie point, but since the present invention does not depend upon natural switching when the material loses its magnetization above the Curie point, as in prior art Curie-point switching techniques, selective magnetization by the combined application of heat and magnetic field may be possible in other materials without heating to the Curie point. In any case, the temperature to which the material must be raised should be significantly above the environmental temperature.

The mirror 15 is vibrated by a solenoid 16 in response to a low-frequency signal which has been used at approximately 75 Hz. but can be other frequencies. This vibrating signal is applied at a terminal 17.

The solenoid 16 may, for example, be a dynamic loudspeaker driver with a mechanical drive connection from the armature thereof to the mirror in order that the mirror 15 will cause the beam to scan the film 10 while it is being moved along is length by a mechanism 18 driven by a synchronous motor 19 connected to the terminal 17. In that manner, the drive mechanism 18 is synchronized with the scanning mechanism comprising the mirror 15 and solenoid 16. For some applications requiring higher frequency scanning, the scanning mechanism may consist of a quartz crystal for vibrating a reflecting surface.

A coil 20 on a C-core is energized by an input signal, which may be an analog signal, from a source 22 through a switch 23 and an amplifier 24 to provide a magnetic field perpendicular to the film 10 with varying magnitude so that, as segments of the film 10 are heated by the laser beam, the magneto-optic density will vary as a function of the input signal due to the varying magnetic field applied while the segments of the continuous record path cool. That density varies as a function of the applied magnetic field if the field magnitude is not increased to saturation, i.e., not increased beyond a point of producing a maximum magneto-optic density.

The C-core is preferably cast out of ferromagnetic material with truncated cone tips having suitable holes **21*a* and 21*b* cast or drilled to provide small annular pole faces with an inside diameter of about 10 mils. The lower hole 21*b* is required for playback using light transmitted through the film 10. It is possible to play back recorded data by analyses and detection of reflected light using the Kerr effect as well as transmitted light using the Faraday effect. Accordingly, if reflected light is employed, it is possible for the lower hole 21*b* to be omitted and suitable optics to be provided on the same side of the film 10** employing techniques well known in the art.

It has been found that the largest Faraday effect in thin films is exhibited when the magnetic field perpendicular to the plane of the film is increased beyond a certain point, but is proportionately less when the magnetic field is decreased. The resulting Faraday effect is sufficiently strong to permit optical playback with a favorable signal-to-noise ratio. As noted hereinbefore, this Faraday effect is exhibited when a beam of polarized light is transmitted through the film parallel to the direction of the magnetic field. The polarization is rotated clockwise or counterclockwise, depending on the relative orientation of the magnetic field with respect to the direction of propagation of the light beam. This orientation requires materials having a large anisotropy with the easy-axis perpendicular to the plane of the film. Such a material is, for example, the compound MnBi which is ferromagnetic at room temperature and has been shown to exhibit a Faraday rotation of ±4° in the visible light region. The actual degree of rotation, which may be referred to as average rotation of the light beam, has been discovered to be proportionate to the applied magnetic field, as noted hereinbefore. Also as noted hereinbefore, other thin films of suitable magnetic material may be used, such as CrTe or $Mn_4Gr_3$.

To play back a recorded signal, the attenuator 12 is deenergized by appropriate actuation of a record-playback control 25. At the same time a solenoid 26 is deenergized allowing the switch 23 to open, thereby disconnecting the input signal source 22 from the amplifier 24. The output current from the amplifier is thereby reduced to substantially zero amperes to remove the applied magnetic field. Deenergizing the attenuator 12 alters the refractive properties of an optical medium in the cell through cause less light to be transmitted to the polarizer 13. Accordingly, the beam of polarized monochromatic light from a laser or other monochromatic light sources focused by the lens 14 and directed onto the film 10 by the mirror 15 is not of sufficient intensity to heat the film 10 to the vicinity of its Curie point, but is of sufficient intensity for light transmitted through the film 10 to be analyzed with respect to the Faraday effect produced by the magneto-optic density record of the input signal applied.

A Faraday analyzer 27 responds to the average rotation of the light transmitted through the film 10 to produce at an output terminal 28 an analog signal directly proportional to the input signal recorded. This may be accomplished by a resolver 29 comprising a Glan-Thompson prism which resolves the polarized light E rotated through an angle $\theta$ upon being transmitted through the film 10 into two components, one with an amplitude E cos $\theta$ and the other an amplitude E sin $\theta$. Detectors 30 and 31 comprising suitable photoconductors then provide electrical signals proportional to the amplitude of the two components, and a differential amplifier 32 provides the desired signal at the output terminal 28. In that manner, any fluctuation in the polarized light source comprising the laser 11, attenuator 12 and polarizer 13 will affect both components equally. Consequently, the output signal will be free of any change in amplitude of the light source.

The fidelity and signal-to-noise ratio experienced in a thermomagnetic recording and optical playback system has been found to be comparable to conventional magnetic recording and superior in respect to information storage density by several orders of magnitude since conventional magnetic recording techniques are limited in density by the transducers used, namely the record and playback heads, while magneto-optic techniques are limited by only the wavelength of light. In other words, the "transducer" employed in magneto-optic recording is a beam of light which can be made smaller than the corresponding "transducer" (magnetic core gap) of conventional magnetic recording by at least three orders of magnitude. For example, it has been found that the unit amenable to magneto-optic recording is as small as $0.25\mu^2$.

FIG. 2 shows a typical plot of the relative transmission $\tau$ of the Faraday effect analyzer 27 as a function of the applied magnetic field H present during recording on a film of MnBi. It should be noted that the zero point of transmission is not at the origin but at about −300 oersteds. Accordingly, a bias field must be provided while recording to provide a field of −300 oersteds while the input signal is at zero volts. That may be readily accomplished by a bias current from the amplifier 24.

A method of synchronizing the recording of data for synchronous playback will now be described with reference to FIG. 3. For recording, the solenoid 26 is energized by the control 25 to close the switch 23. At the same time, switches 33 and 34 ganged together with the switch 23 are actuated to connect a low-frequency oscillator 35 to the terminal 17 in order to synchronize a synchronous motor 19 with the lateral scanning produced by the mirror 15 and solenoid 16 (FIG. 1) for recording. The data recording and playback system is illustrated in FIG. 3 as a block 36. That system is employed for recording on the film 10 across its width leaving a single track along the lower edge as viewed in FIG. 3. A separate recording and playback system 37 identical to the system 36 (shown in FIG. 1) is provided, but with a stationary beam deflecting means in order to record on a single track the low-frequency signal form the oscillator 35.

As the low-frequency signal is applied from the oscillator 35 to the data recording and playback system 36 via the switch 34, the low-frequency signal is recorded by the system 37 via the switch 33. For playback, the solenoid 26 is deenergized, thereby allowing switches 23, 33 and 34 to return to the positions shown to connect the synchronous motor 19 and beam deflecting means of data recording and playback system 36 to an output terminal 38 of the recording and playback system 37. That provides a synchronizing signal to the synchronous motor 19 and beam deflecting means of the recording and playback system 36 for synchronous playback.

A particular application for the present invention is the recording of television signals, in which case the signal source 22 may be a television camera. The video signal from the camera would, of course, include not only the picture signal resulting from interlaced scanning of the subject, but also frame blanking pulses, horizontal and vertical synchronizing pulses and equalizing pulses for control of a receiver during playback. In that regard, it should be understood that the horizontal synchronizing pulses need not be synchronized with the operation of the solenoid 16 and synchronous motor 19 (or such other apparatus as might be employed to scan the film 10 for recording) since the video signal from the source 22 includes all the necessary synchronizing signals for display at a receiver coupled to the output terminal 29. That coupling may be by electromagnetic waves if a carrier is added to the video signal by a transmitter connected to the output terminal 29. To complete the transmission, the audio signal may be synchronously recorded on and played back from the same film 10 by a separate data recording and playback system synchronized with the motor 19.

It should be appreciated that the invention is in no sense dependent upon particular components disclosed nor to the particular application suggested. In its broadest aspects, the invention may be implemented with any focused beam of radiant energy for heating the film 10 along a path as narrow as ¼ micron for recording, and for playback any low intensity focused beam of monochromatic light may be employed. To detect the magneto-optic effect, any suitable analyzer may be employed. In that regard, it should be noted that the detectors 30 and 31 are photosensitive in the broadest sense, i.e., are devices exhibiting a photoelectric effect due to radiation of light from the resolver, including the photovoltaic effect of light as well as the photoconductive and photoemissive effects of light on suitable devices commercially available. Accordingly, it is not intended that the scope of the invention be determined by the disclosed exemplary embodiments, but rather should be determined by the breadth of the appended claims.

We claim:

1. A method of thermomagnetic recording an electrical analog signal on a film of suitable magnetic material by heating a continuous trace of successive areas of said film to the vicinity of the Curie point of said material using a focused laser beam, maintaining a variable magnetic field over an area significantly greater than and including each of said successive areas of said film while being heated, varying said magnetic field as a function of said analog signal, and allowing said areas to cool successively in the presence of said magnetic field, thereby allowing high density analog recording.

2. A system for thermomagnetic recording an electrical analog signal on a film of suitable magnetic material comprising means for heating a trace of successive areas on said film to the vicinity of the Curie point of said film using a focused laser beam, means for maintaining a variable magnetic field over an area significantly greater than and including each of said successive areas of said film while being heated, and means for varying said magnetic field as a function of said analog signal, thereby subjecting said areas of said trace to a variable magnetic field while said areas cool after heating for allowing high density recording.

3. Apparatus for recording an analog signal on a suitable film of magnetic material for magneto-optic playback, comprising:

means for establishing a variable magnetic field at a fixed recording station in response to said analog signal;

means for passing said film through said field with the direction of said field normal to the surface of said film; and means for heating a continuous trace of successive areas of said film to the vicinity of the Curie point of said material using a focused laser beam while said areas are in the presence of said field and for allowing said successive areas thus heated to immediately cool while in the presence of said field, whereby a given section of said trace thus heated and cooled is subjected to a magneto-optic density variation in response to said analog signal.

4. Apparatus as defined in claim 3 wherein said means for heating includes means for attenuating said focused laser beam for playback, whereby said trace is not heated to the vicinity of its Curie point during playback, and further includes means for polarizing said laser beam and means for analyzing the magneto-optic effect produced by said magneto-optic density upon said attenuated polarized laser beam.

5. Apparatus as defined in claim 4 wherein said means for analyzing the magneto-optic effect produced by said magneto-optic density upon said polarized laser beam comprises means for resolving said attenuated polarized laser beam into orthogonal components after it has been subjected to the magneto-optic effect produced by said magneto-optic density, means for detecting the amplitude of each component separately, and means for obtaining the difference in amplitude between said detected components.

6. Apparatus as defined in claim 4 wherein said means for establishing a variable magnetic field comprises a C-core having opposing pole faces, one on each side of said film, and a coil to which said signal is applied, said core having a hole in at least one pole face through which said laser beam is directed onto said film in a direction substantially normal thereto.

7. Apparatus as defined in claim 3 wherein said means for heating includes a lateral scanning means for synchronously deflecting said laser beam back and forth across said film in a direction substantially normal to the direction for passing said film through said field, said scanning means functioning in response to an external synchronizing signal, and means for recording on said film said external synchronizing signal.

8. Apparatus as defined in claim 7 wherein said means for heating said trace includes means for attenuating said laser beam for playback, whereby said film is not heated to the vicinity of its Curie point during playback.

9. Apparatus as defined in claim 8 including means for detecting said recorded synchronizing signal for synchronizing deflection of said attenuated polarized laser beam during playback of said recorded input signal.

* * * * *